United States Patent [19]

Bolze et al.

[11] 4,341,671
[45] Jul. 27, 1982

[54] POLYESTER AMIDE MELT ADHESIVES

[75] Inventors: Manfred Bolze, Bergkamen-Oberaden; Manfred Drawert, Froendenberg-Strickherdicke, both of Fed. Rep. of Germany

[73] Assignee: Schering AG, Berlin and Bergkamen, Fed. Rep. of Germany

[21] Appl. No.: 197,787

[22] Filed: Oct. 17, 1980

[30] Foreign Application Priority Data

Oct. 23, 1979 [DE] Fed. Rep. of Germany ....... 2942680

[51] Int. Cl.³ .............................................. C08G 69/14
[52] U.S. Cl. ................... 528/324; 528/339.3; 528/330; 428/474.4
[58] Field of Search ...................... 260/18 N; 528/324

[56] References Cited

U.S. PATENT DOCUMENTS

| | | | |
|---|---|---|---|
| 2,653,880 | 9/1953 | Hendricks et al. | 117/68.5 |
| 3,397,816 | 8/1968 | Ess et al. | 220/81 N |
| 3,582,507 | 6/1971 | Peerman | 260/23 |

FOREIGN PATENT DOCUMENTS

| | | |
|---|---|---|
| 1076030 | 9/1964 | United Kingdom . |
| 1055610 | 1/1967 | United Kingdom . |
| 1055676 | 1/1967 | United Kingdom . |
| 1138142 | 12/1968 | United Kingdom . |
| 1226122 | 3/1971 | United Kingdom . |
| 1227858 | 4/1971 | United Kingdom . |

OTHER PUBLICATIONS

English language translation of claim 1, German Patent, 1,520,002.

*Primary Examiner*—Harold D. Anderson
*Attorney, Agent, or Firm*—Curtis, Morris & Safford

[57] ABSTRACT

What are disclosed are melt adhesives comprising a polyesteramide having a slow solidification rate, comprising
(A) a dimerized fatty acid having 16–44 carbon atoms; optionally in admixture with a monocarboxylic acid,
(B) a member selected from the group consisting of caprolactam and 6-aminocaproic acid, wherein 0.25–5.0 mol of component (B) is employed per mol of carboxyl groups present in component (A).
(C) a monoalkanolamine of the formula $HO-R-NH_2$, wherein R is linear or branched aliphatic hydrocarbon having 2 to 8 carbon atoms which may be interrupted by oxygen atoms, and
(D) a member selected from the group consisting of diprimary, disecondary, and primary-secondary diamines, wherein the equivalence ratio of (C):(D) is between 0.1:0.9 and 0.9:0.1.

7 Claims, No Drawings

POLYESTER AMIDE MELT ADHESIVES

The present invention relates to polyester amide melt adhesives.

In working with melt adhesives, the rate of hardening or the "open time" is an important criterion. From a melt, the commercially available melt adhesives comprising dimerized fatty acids, e.g. corresponding polyamides or polyesters free of dimerized fatty acids such as polyethylene terephthalate, adhere substrates which are at room temperature in about 1-2 seconds. This extremely short period of time can only be minimally increased by using the highest possible temperature of the melt—which is precluded in the case of heat-sensitive substrates—or by preheating of the substrate.

Melt adhesives having a high softening point adhere particularly rapidly.

If substrates having a large surface area must be coated with a melt adhesive, or if the substrate to be adhered has a high heat conductivity (e.g. metals), such a rapid bonding of the adhesive leads to defective or completely useless adhesive bonds.

Often, as a result of an inexact arrangement of the parts to be adhered, a readjustment of the just-adhered parts is necessary. This is no longer possible in the case of melt adhesives which bond too rapidly.

In order to adhere metals with melt adhesives of the present state of the art, preheating is necessary in order to effect a good wetting of the metal by the adhesive for the achievement of optimal adhesive values.

Thus, an additional working step must be carried out. The object of the present invention is to overcome these disadvantages of the state of the art and to find melt adhesives comprising dimeric fatty acids which, in addition to known good properties such as flexibility and adhesive strength, also have low rates of hardening, that is a long open time. The last-mentioned property should also be present in melt adhesives having high softening points.

This object has been achieved according to the present invention by the formulation of melt adhesives comprising polyester amides with low rates of hardening and comprising (A) dimerized fatty acids having 16-44 carbon atoms, optionally in admixture with monocarboxylic acids and (B) caprolactam and/or 6-aminocaproic acid wherein 0.25-5.0 mol of component (B) is employed per mol of carboxyl groups in component (A), and (C) monoalkanolamines of the general formula

HO-R-NH$_2$, wherein R is an aliphatic hydrocarbon group having 2-8 carbon atoms which may optionally be branched or interrupted by oxygen atoms and (D) diprimary and/or disecondary and/or primary-secondary diamines, wherein the equivalence ratio of (C):(D) is between 0.1:0.9 and 0.9:1.0, particularly between 0.3:0.7 and 0.7:0.3.

A further object of the invention is the use of the polyester amides as melt adhesives for the adhesion of organic and inorganic substrates.

The sum of the molar equivalents of the amine groups and hydroxyl groups of components (C) and (D) which are used is practically equal to the molar equivalents of carboxyl groups of component (A).

The condensation of the aforementioned components to form the polyester amides according to the invention takes place at temperatures between 200° C. and 300° C. in the usual fashion.

The expression "dimerized fatty acid" refers herein generally to polymerized acids which are obtained from "fatty acids". The term "fatty acid" encompasses unsaturated natural and synthetic monobasic aliphatic acids having 8 to 22 carbon atoms, preferably 18 carbon atoms. These fatty acids can be polymerized according to known methods (cf. DE-OS Nos. 1,443,938, DE-OS 1,443,968, DE-PS 2,118,702 and DE-PS 1,280,852).

Polymeric fatty acids which are typically obtainable commercially have the following approximate composition:
monomeric acids: 5-15 percent by weight
dimeric acids: 60-80 percent by weight
trimeric acids: 10-35 percent by weight.

The content of dimeric acids can be increased up to 100 percent by weight by generally known distillation methods.

The dimeric fatty acids employed can also be present in hydrogenated form.

When distilled dimeric fatty acids are employed, melt adhesives having an improved color number are obtained. On the other hand, the use of commercially available technical polymerized fatty acids is possible for the preparation of adhesives useful for particular purposes. When technical dimeric fatty acids are used, it should only be mentioned that the content of trimeric fatty acid should not exceed a maximum limit. This limiting value depends upon the particular content of dimeric and monomeric fatty acids in the polymerized fatty acid and can be determined by an orientation test well within the every day routine skills of the average man skilled in the art.

However, distilled dimerized fatty acid having a content of dimeric fatty acid of 80-96 percent by weight is preferably employed.

The content of monocarboxylic acids which may possibly already be present in the dimerized fatty acids can be increased by the addition of further monocarboxylic acids in order to achieve a desired molecular weight. The size of this fraction is dependent on the desired molecular weight of the end product, on the relationship between the components taking part in the formation of the polymer molecule, and on the composition of the dimerized fatty acid which is used. In general, an additional content of 15 mol percent, calculated on the dimerized fatty acid or the fatty acid mixture, is sufficient for achieving the adjustment of the desired molecular weight.

As monocarboxylic acids which can be employed according to the invention, linear or branched, saturated or unsaturated, monocarboxylic acids having 12-22 carbon atoms come into particular consideration, such as lauric acid, palmitic acid, palmitoleinic acid, and erucic acid. Preferred acids for use according to the invention are the C$_{18}$-monocarboxylic acids such as stearic acid, oleic acid, linoleic acid, linolenic acid, and natural fatty acid mixtures such as tall oil fatty acid or soya oil fatty acid.

The monocarboxylic acids can be used either alone or in admixture. In case it is necessary for particular fields of use, the use of co-use of monocarboxylic acids with less than 12 carbon atoms is possible.

In addition to the dimeric fatty acids, caprolactam or 6-amino-caproic acid are added. Higher lactams lead to products which are not useful to achieve the goals of the present invention.

The monomeric caprolactam which is in equilibrium with the polymeric condensation product after the reaction is distilled off after the condensation until a sump temperature of at most 250° C. is reached at about 20 mbar.

The ratio of (A):(B) is essentially determined by the desired softening point or the desired resistance to heat as well as by the desired bonding time. The products which are preferred according to the invention have ring and ball softening points from 100° C. to 200° C. and bonding rates of more than 4 seconds, measured on "Noratest" rubber at room temperature. To achieve these values, 0.25–5.0 mols, particularly 1–3 mols, of caprolactam or 6-amino-caproic acid are employed per mol of carboxyl groups of the dimeric fatty acid and the optionally employed monocarboxylic acid [component (A)].

The alkanolamines used according to the present invention are encompassed by the general formula

HO-R-NH$_2$, wherein R is aliphatic hydrocarbon having 2–8 carbon atoms which may be linear or branched or may be interrupted by oxygen atoms.

As examples, the following materials are mentioned: n-propanolamine, butanolamine, 2-amino-4-pentanol, 2-amino-3-hexanol, 5-amino-4-octanol, 3-amino-3-methyl-2-butanol, and, particularly, monoethanolamine, isopropanolamine, neopentanolamine, and diglycolamine.

The aforementioned aminoalcohols can be used alone or in admixture.

The following are mentioned as exemplary of the diprimary amines used according to the invention: ethylenediamine, 1,3-diaminopropane, 1,2-diaminododecane, 1,6-diaminohexane, 1,9-diamino-nonane, 1,12-diaminododecane, dimeric fatty acid diamine, a mixture of 2,2,4-trimethylhexamethylene diamine and 2,4,4-trimethylhexamethylene diamine, either diamines of the general formula H$_2$N-(CH$_2$)$_n$-O-(R-O)$_x$-(CH$_2$)$_2$-NH$_2$ wherein n is a number from 3–5, x has a value of 0, 1, 2, or 3, and R is an alkylene group having a chain length of from 1 to 12 carbon atoms which can also carry alkyl substituents having 1 to 4 carbon atoms such as 1,7-diamino-4-oxaheptane, 1,11-diamino-6-oxaundecane, 1,7-diamino-3,5-dioxaheptane, 1,10-diamino-4,7-dioxa-5-methyldecane, 1,11-diamino-4,8-dioxaundecane, 1,11-diamino-4,8-dioxa-5-ethylundecane, 1,12-diamino-4,9-dioxadodecane, 1,3-diamino-4,10-dioxatridecane, 1,4-diamino-4,11-dioxatetradecane, 1,11-diamino-4,8-dioxa-5,6-dimethyl-7-propionylundecane, 1,14-diamino-4,7,10-trioxa-tetradecane, 1,13-diamino-4,7,10-trioxa-5,8-dimethyltridecane, 1,20-diamino-4,17-dioxaeicosane, and 1,16-diamino-4,7,10,13-tetraoxahexadecane.

As examples of the disecondary diamines of the present invention, diamines of the general formula

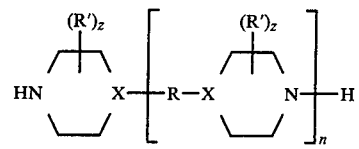

wherein R' is CH$_3$, z is 0, 1, or 2, R is linear or branched alkyl having 2 to 12 carbon atoms, and n is 0 or 1. Further, when n is 0, then X is N and when n is 1, then X is N or CH. Typical of such diamines are piperazine, 2,5-dimethylpiperazine, 1,3-dipiperidyl propane, and the dipiperazyl alkanes encompassed by the formula.

Amines having primary and secondary amino groups in the molecule can also be used, particularly N-(aminoloweralkyl)piperazines such as N-aminoethyl piperazine and N-aminopropyl piperazine, and N-(aminoloweralkyl)dipiperidyl lower alkanes such as N-aminopropyl dipiperidyl propane. However, the diprimary and disecondary diamines, or mixtures thereof, are preferred.

The aforementioned diamines can be employed alone or in admixture.

The ratio of (C):(D) is generally determined by the desired degree of flexibility in the end product and can be varied between 0.1:0.9 and 0.9:0.1. The region between 0.3:0.7 and 0.7:0.3 is preferred according to the invention.

Both organic and also inorganic materials, for example leather, rubber, wood, paper, synthetic resins such as PVC, polyolefins, and polyesters, and ceramics can be bonded with the products of the present invention either to like materials or to different materials.

Products having open times of more than 30 seconds, measured at room temperature using "Noratest" test rubber, are used with particular success for the adhesion of metal and metal-coated films or metal-coated papers. The particular advantage is to be seen in that the preheating of the metal or of the metal-coated substrate which has until now been necessary when using the resins belonging to the state of the art is no longer necessary when using the resins according to the present invention.

As metals, the ferrous and non-ferrous metals common in technology come into consideration, such as aluminum, iron, copper, zinc, tin, or their alloys. To the extent desired, the adhesion of metals to other organic or inorganic substrates is possible.

The testing of the open time takes place according to the following method, the result of which are set forth in the Table.

A stretched piece of rubber ("Noratest" rubber) 3 mm thick having a surface area of 6 cm$^2$ is adhered to a second rubber piece. The adhesive joint is about 70–80 microns thick. A tensile force of 0.067 N/mm$^2$ is exerted on the adhered rubber piece by means of spring tension. The open time is that time at which tensile force is no longer able to pull off the upper rubber piece from the lower rubber piece. The test on metals follows using the same test arrangement. The values given in Table III are measured on sandblasted sheet steel C 75.

This method has the advantage that the open time is determined on an adhesive joint corresponding to that which occurs in practice.

The dimeric fatty acid used in the following Examples had the following composition (determined by gas-liquid chromatography):

EXAMPLES 1, 3–10

| | |
|---|---|
| monomeric fatty acid | 2.7% |
| dimeric fatty acid | 94.1% |
| trimeric and higher polymeric fatty acid | 3.2% |

EXAMPLE 2

| | |
|---|---|
| monomeric fatty acid | 13.6% |
| dimeric fatty acid | 69.9% |
| trimeric and higher polymeric fatty acid | 16.5% |

EXAMPLE 11

| | |
|---|---|
| monomeric fatty acid | 8.2% |
| dimeric fatty acid | 82.0% |
| trimeric and higher polymeric fatty acid | 9.8% |

A better understanding of the invention and of its many advantages will be had by referring to the following specific Example, given by way of illustration.

EXAMPLE 1

A 1 liter 3-necked flask equipped with a thermometer, nitrogen inlet, stirrer, and condenser and receiver was charged with 259.9 g of distilled dimerized tall oil fatty acid, 13.7 g of monomeric tall oil fatty acid, and 162.7 g of caprolactam (mol ratio of fatty acids: caprolactam = 1:3).

After evacuating the flask three times and subsequently breaking the vacuum with nitrogen, and after stirring, the reaction components were heated to 60° C. under nitrogen and 14.45 g of ethylene diamine (0.5 equivalent) and 15.02 g of ethanolamine (0.5 equivalent) were added. The reaction mixture was then heated to 150° C. and held under reflux for 45 minutes. Then the temperature was raised to 240° C. over a further 75 minutes. This temperature was maintained for 4 hours. During the last two hours, a vacuum of 20 mm/Hg was applied in order to remove residual water of reaction and equilibrium caprolactam.

The finished resin had a ring and ball softening point of 138° C. and a melt viscosity of 4.9 Pa.s at 200° C.

The open time (at an application temperature of the resin of 180° C.) was 90 seconds at room temperature and 300 seconds at 70° C. on "Noratest" rubber.

The procedure of this Example was repeated except that 188.6 g of 6-aminocaproic acid were substituted for caprolactam (mol ratio fatty acid: 6-amino-caproic acid = 1.3). The resulting product had physical properties identical to those reported earlier herein for the product prepared with caprolactam.

The resins shown in following Tables I—III were prepared in analogous fashion.

TABLE I

| Example | Dimeric (A) Fatty Acid | Monomeric (A) Fatty Acid | Caprolactam (B) | Mol of Caprolactam (B) per Mol of COOH (A) | Alkanolamine (C) | Diamine (D) | Equivalents (C):(D) | Ring and Ball Softening Point (°C.) | Melt Viscosity (Pa.s at 200° C.) |
|---|---|---|---|---|---|---|---|---|---|
| 2 | 359.1 g | — | 71.19 g | 0.5 | 14.20 g isopropanolamine | 26.55 g ethylenediamine | 0.3:0.7 | 109 | 1.8 |
| 3 | 259.0 g | 21.00 g stearic acid | 166.53 g | 1.5 | 25.95 g neopentanolamine | 14.79 g ethylenediamine | 0.5:0.5 | 136 | 1.1 |
| 4 | 202.4 g | 17.60 g stearic acid | 218.00 g | 2.5 | 20.27 g diglycolamine | 11.62 g ethylenediamine | 0.5:0.5 | 173 | 1.1 |
| 5 | 249.8 g | 20.25 g stearic acid | 160.58 g | 1.5 | 14.53 g ethanolamine | 47.41 g 1,12-diaminododecane | 0.5:0.5 | 134 | 1.4 |
| 6 | 144.0 g | 16.00 g stearic acid | 285.50 g | 4.5 | 13.78 g ethanolamine | 31.52 g dimeric fatty acid diamine | 0.8:0.2 | 193 | 5.8 |
| 7 | 205.2 g | 22.80 g stearic acid | 226.00 g | 2.5 | 12.27 g ethanolamine | 23.27 g 1,6-diaminohexane | 0.5:0.5 | 178 | 4.1 |
| 8 | 228.0 g | — | 135.60 g | 1.5 | 12.20 g ethanolamine | 40.80 g 1,12-diamino-4,9-di-oxadodecane | 0.5:0.5 | 142 | 3.8 |
| 9 | 250.8 g | 34.20 g stearic acid | 141.25 g | 1.25 | 12.70 g ethanolamine | 25.82 g piperazine | 0.4:0.6 | 127 | 0.5 |
| 10 | 263.6 g | 21.40 g stearic acid | 141.25 g | 1.25 | 12.27 g ethanolamine | 64.18 g dipiperidylpropane | 0.4:0.6 | 130 | 1.2 |
| 11 | 285.0 | — | 113.00 g | 1.0 | 15.26 g ethanolamine | 32.3 g N-aminoethylpi- | 0.5:0.5 | 122 | 13 |

TABLE I-continued

| Example | Dimeric (A) Fatty Acid | Monomeric (A) Fatty Acid | Caprolactam (B) | Mol of Caprolactam (B) per Mol of COOH (A) | Alkanolamine (C) | Diamine (D) | Equivalents (C):(D) | Ring and Ball Softening Point (°C.) | Melt Viscosity (Pa.s at 200° C.) |
|---|---|---|---|---|---|---|---|---|---|
| | | | | | | perazine | | | |

TABLE II

| | Open Time on "Noratest" Test Rubber | | Application Temperature of the Resin |
|---|---|---|---|
| Example | at room temperature | at 70° C. | (°C.) |
| 2 | 5 sec. | 90 sec. | 180 |
| 3 | about 10 min. | — | 180 |
| 4 | about 8 min. | about 10 min. | 200 |
| 5 | about 6 min. | about 10 min. | 180 |
| 6 | 5 sec. | 50 sec. | 220 |
| 7 | 7 sec. | 90 sec. | 200 |
| 8 | 30 sec. | 120 sec. | 180 |
| 9 | about 10 min. | — | 180 |
| 10 | about 10 min. | — | 180 |
| 11 | about 60 sec. | about 3 min. | 180 |

TABLE III

| | Tests on sandblasted sheetsteel C 75 | | |
|---|---|---|---|
| Example | Open Time at Room Temperature | Tensile Shear Strength According to DIN 53283 (N/mm²) | Application Temperature of the Resin (°C.) |
| 3 | about 1 min. | 7.6 | 180 |
| 5 | about 2-3 min. | 8.5 | 180 |
| 9 | about 3 min. | 3.2 | 180 |
| 10 | about 1 min. | 4.3 | 180 |

What is claimed is:

1. A polyesteramide melt adhesive having a slow solidification rate, which melt adhesive is the polymeric reaction product of
(A) a dimerized fatty acid having 16–44 carbon atoms,
(B) a member selected from the group consisting of caprolactam and 6-aminocaproic acid, wherein 0.25–5.0 mol of component (B) is employed per mol of carboxyl groups present in component (A),
(C) a monoalkanolamine of the formula $$HO\text{-}R\text{-}NH_2,$$

wherein R is a member selected from the group consisting of linear and branched aliphatic hydrocarbon having 2 to 8 carbon atoms and such aliphatic hydrocarbon interrupted by at least one oxygen atom, and
(D) a member selected from the group consisting of diprimary, disecondary, and primary-secondary diamines, wherein the equivalence ratio of (C):(D) is between 0.1:0.9 and 0.9:0.1.

2. A melt adhesive as in claim 1 wherein component (C) is monoethanolamine, isopropanolamine, neopentanolamine, or diglycolamine.

3. A melt adhesive as in claim 1 wherein component (D) is ethylenediamine, hexamethylenediamine, dimeric fatty acid diamine, 1,12-diamino-4,9-dioxa-dodecane, or piperazine.

4. A melt adhesive as in claim 1 wherein in that 1–3 mols of component (B) are used per mol of carboxyl groups present in component (A).

5. A melt adhesive as in claim 1 wherein the equivalence ratio of (C):(D) is between 0.3:0.7 and 0.7:0.3.

6. A melt adhesive as in claim 1 wherein the melt adhesive has a hardening time longer than 4 seconds for the adhesion of substrates at room temperature.

7. A melt adhesive as in claim 1 wherein said dimerized fatty acid (A) comprises a monocarboxylic acid admixed therewith.

* * * * *